United States Patent
Nakada et al.

(10) Patent No.: US 7,044,598 B2
(45) Date of Patent: May 16, 2006

(54) LENS FOR EYE AND METHOD FOR MARKING THEREOF

(75) Inventors: Kazuhiko Nakada, Nisshin (JP); Masahiro Matsumoto, Kasugai (JP)

(73) Assignee: Menicon Co., Ltd., Nagoya (JP)

( * ) Notice: Subject to any disclaimer, the term of this patent is extended or adjusted under 35 U.S.C. 154(b) by 0 days.

(21) Appl. No.: 11/125,003

(22) Filed: May 9, 2005

(65) Prior Publication Data

US 2005/0206843 A1    Sep. 22, 2005

Related U.S. Application Data

(63) Continuation of application No. PCT/JP03/13459, filed on Oct. 22, 2003.

(30) Foreign Application Priority Data

Nov. 25, 2002  (JP)  .............................. 2002-340504

(51) Int. Cl.
*G02C 7/04*  (2006.01)
(52) U.S. Cl. ...................... 351/162; 351/177; 623/6.56
(58) Field of Classification Search ........ 351/162–163; 623/6.17, 6.56
See application file for complete search history.

(56) References Cited

U.S. PATENT DOCUMENTS 4,559,059 A * 12/1985 Su .................................. 8/507
4,702,574 A * 10/1987 Bawa ............................. 8/507
5,151,106 A    9/1992 Bhaumik et al.
6,087,062 A *  7/2000 Cunningham et al. ... 430/270.1
2004/0170924 A1* 9/2004 Kunimoto et al. ....... 430/281.1

FOREIGN PATENT DOCUMENTS

| JP | 57-210317 A1 | 12/1982 |
| JP | 62-288812 A1 | 12/1987 |
| JP | 04-270312 A1 | 9/1992 |
| JP | 06-031654 A1 | 2/1994 |
| JP | 06-258604 A1 | 9/1994 |
| JP | 08-327954 A1 | 12/1996 |

* cited by examiner

Primary Examiner—Jordan M. Schwartz
(74) Attorney, Agent, or Firm—Burr & Brown

(57) ABSTRACT

It is an object of the present invention to provide an ophthalmic lens characterized in that it is capable of developing a color at a position where a light is irradiated, and to provide a marking method of the ophthalmic lens. It is another object of the present invention to provide an ophthalmic lens, which can form a clear and easily readable mark, without causing problems such as discoloration of the mark, caused by cleaning of the lens by rubbing, or deterioration of the mechanical strength of the lens, and to provide a marking method of the ophthalmic lens. The ophthalmic lens of the present invention is obtained by a polymerization of a polymerizable composition of monomers, which contains an alkyl (meth)acrylate as an essential polymerizable component, and this polymerization is carried out while the rhodamine derivative is present in the composition.

6 Claims, 1 Drawing Sheet

LENS FOR EYE AND METHOD FOR MARKING THEREOF

CROSS REFERENCE TO RELATED APPLICATION

This application is a continuation application of International Application Ser. No. PCT/JP2003/013459, having an international filing date of Oct. 22, 2003, and claims the benefit of Japanese Application 2002-340504, filed Nov. 25, 2002.

TECHNICAL FIELD

The present invention relates in general to an ophthalmic lens and a marking method thereof. More particularly, the present invention relates to an ophthalmic lens, which is arranged to contain, in its material, a rhodamine derivative whose color can be changed by an irradiation of a light, and to a marking method of the ophthalmic lens.

BACKGROUND ART

Conventionally, an ophthalmic lens such as a contact lens or an intraocular lens is provided with an identifying mark in the form of characters such as numbers and alphabets, figures, symbols, etc., principally for easy distinction between the front and back surfaces of the lens or between lenses for the left and right eyes, and/or indicating the specifications and/or maker of the lens, for instance.

Various methods are known for marking the ophthalmic lens with the above-mentioned characters, figures, and symbols. For example, there are known printing methods in which marks are transferred on the lens surface by using dyes or colorants (see, for example, JP-A-4-270312 and JP-A-62-288812), and laser radiation marking methods in which desired marks are printed or engraved by irradiation of a laser radiation (see, for example, JP-A-6-31654 and JP-A-57-210317).

However, for the mark formed by the former printing method, there are concerns that the dyes or colorants of the mark may be flowed off, discolor, or peel off due to various treatments repeatedly conducted on the lens, such as cleaning of the lens by rubbing and repetitive disinfection. Moreover, marking of an ophthalmic lens by the printing method requires many process steps for marking the ophthalmic lens, such as a drying step after the printing, and also requires many devices for the process steps. In addition, the ophthalmic lens needs to be handled frequently, undesirably resulting in a high defect or reject ratio of the ophthalmic lens. Accordingly, the cost of manufacture of the ophthalmic lens is undesirably increased, causing a problem of poor economy.

Meanwhile, the mark formed by the latter laser radiation marking method is not easily readable. In addition, as the mark is made by forming grooves or recesses on the lens surface by the laser radiation, the thickness of the portions of the lens, which are subjected to the laser radiation, is inevitably reduced, or the lens material is denatured by the laser radiation. In either case, the strength of the ophthalmic lens is reduced. Further, deposits are likely to accumulate in the grooves or recesses made by the laser radiation, causing undesirable troubles such as irritation of the eye of the lens user.

JP-A-6-258604 discloses a molding method using a material for transfer printing, in which the material has printing layers including a layer of a pattern. By molding a contact lens in this way, the contact lens with the pattern, whose surface is positioned on the surface of the contact lens without a difference in level, is obtained. As an example for the dye for the layer of the pattern, a rhodamine, which is a fluorescent material, may be used. However, there are also concerns for the contact lens prepared by the above-mentioned method that the dye may be flowed off, or the pattern may be discolored or peeled off, due to cleaning of the lens by rubbing and/or repetitive disinfection.

Therefore, the inventors of the present invention have made various studies to obtain a marking method of an ophthalmic lens to form a clear and easily readable mark, without causing problems such as discoloration of the mark caused by cleaning of the lens by rubbing or deterioration of the mechanical strength of the lens. The studies made by the inventors of the present invention have revealed that if a rhodamine derivative, which exhibits desired coloring effect, is previously added to a predetermined polymerizable composition of monomers for the ophthalmic lens, and then the polymerizable composition of monomers is polymerized, the color of the rhodamine derivative is discolored or faded. The studies have also revealed that if the ophthalmic lens made of the polymer, which is obtained by the above polymerization, is irradiated with a light, the discolored color of the rhodamine derivative is restored at the position where the light is irradiated.

DISCLOSURE OF THE INVENTION

The present invention was developed in the light of the background art situations described above. It is therefore an object of the present invention to provide an ophthalmic lens, characterized in that it is capable of developing a color at the position where the light is irradiated, and to provide a marking method of the ophthalmic lens.

It is another object of the present invention to provide an ophthalmic lens, which can form a clear and easily readable mark, without causing problems such as discoloration of the mark caused by cleaning of the lens by rubbing, or deterioration of the mechanical strength of the lens, and to provide a marking method of the ophthalmic lens.

Therefore, the present invention is provided to achieve the above-mentioned technical objects. The principle of the present invention is to provide an ophthalmic lens characterized in that the ophthalmic lens consists of a polymer including a rhodamine derivative at its discolored state, wherein the polymer is obtained by a polymerization of a polymerizable composition of monomers, which contains an alkyl (meth)acrylate as an essential component thereof, and the polymerization is carried out while the rhodamine derivative is present in the composition, and the rhodamine derivative in the ophthalmic lens is capable of developing a color by an irradiation of a light.

Namely, in the ophthalmic lens according to the present invention, an alkyl (meth)acrylate is employed as an essential component (polymerizable component) of the polymerizable composition of monomers, and the rhodamine derivative is added to the polymerizable composition of monomers, and then the polymerizable composition of monomers is polymerized in the presence of the rhodamine derivative. In this way, the ophthalmic lens according to the present invention is formed of a polymer, which is obtained by the polymerization of the polymerizable composition of monomers, in the presence of the rhodamine derivative. Accordingly, the color of the rhodamine derivative is discolored, so that the rhodamine derivative is contained in the ophthalmic lens at its discolored state, although the mechanism of the discoloration has not been revealed. Moreover, if a light is irradiated to the ophthalmic lens, the color of the rhodamine derivative is restored, at the position where the light is irradiated.

Therefore, if the light is irradiated to a predetermined position of the above-mentioned ophthalmic lens in a desired shape, only the irradiated positions of the ophthalmic lens is effectively colored, so that a clear and easily readable mark can be formed. In particular, the ophthalmic lens according to the present invention can be colored, not only on the surface of the lens, but also throughout the depth of the lens. Therefore, it is possible to form a mark, which is especially easy to be recognized.

If the above-mentioned ophthalmic lens, for example a contact lens, is worn on an eye, the contact lens naturally receives a light such as a sunlight or a light from an illumination, so that all over the contact lens is gradually colored. This process of coloring has a function as an indicator to confirm the period of use of the contact lens.

In one preferred form of the present invention, it is preferable to employ, as the above-mentioned rhodamine derivative, a compound which is represented by the following formula (I),

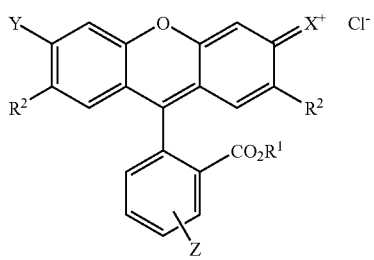

(I)

wherein each of X and Y is independently selected from the group consisting of $NH_2$, NHMe, NHEt, $NMe_2$ and $NEt_2$; Z is selected from the group consisting of H, $CH_2=C(CH_3)COO—$, $CH_2=C(CH_3)COO(CH_2)n—$, and $CH_2=C(CH_3)COO(CH_2)n—O—$; and n represents an integer of 1–6.

In another preferred form of the present invention, it is preferable to employ an alkyl (meth)acrylate, which contains 1–4 carbon atom(s), as the above-mentioned alkyl (meth)acrylate. If this sort of alkyl (meth)acrylate is employed, discoloration or fading of the color of the rhodamine derivative, during the polymerization, is more effectively occurred, as well as the coloration of the rhodamine dye during the irradiation of the light is more effectively carried out.

In still another preferred form of the present invention, it is preferable that a concentration of the alkyl (meth)acrylate is not less than 10% by weight in the polymerizable composition of monomers.

In addition to the above, according to the principle of the present invention, there is also provided a marking method of an ophthalmic lens, characterized in that the color of the rhodamine derivative is developed by irradiation of the light to a predetermined position of the above-mentioned ophthalmic lens, in order to form a mark whose shape is corresponded to the position which is irradiated by the light.

In the present marking method, wherein a predetermined mark such as a character, figure, or symbol is emerged by coloring the predetermined position of the ophthalmic lens, by the development of the color of the rhodamine derivative, by irradiation of the light, so that the clear and especially easily readable marks can be effectively formed. Moreover, the mark in accordance with the present method is formed by coloring the lens body itself, so that the color does not fade by cleaning of the lens by rubbing, unlike a mark, which is adhered by printing, for instance, to the surface of the lens. In addition, the mechanical strength of the ophthalmic lens will not be deteriorated by the marking in accordance with the present method, because no recess is formed on the lens surface.

In order to form a desired mark by irradiation of the light, the ophthalmic lens may be covered with a mask, including a section which permeates the irradiated light and which has a shape corresponding to the shape of the desired mark, before the irradiation of the light. Alternatively, a laser radiation may be scanned to form the desired mark. Either of these methods of irradiation may be selected whenever it is applicable. It is needless to say that, if the latter method of the irradiation of the laser radiation is selected, the laser radiation is not used to engrave the mark on the surface of the ophthalmic lens.

In still another preferred form of the present invention, it is preferable that the light for the irradiation has a wavelength of 320–420 nm, and more preferably, the light has a wavelength of 350–380 nm. Irradiation of the above-mentioned light enables the rhodamine derivative to develop the color still more effectively.

BEST MODE FOR CARRYING OUT THE INVENTION

Figure 1:
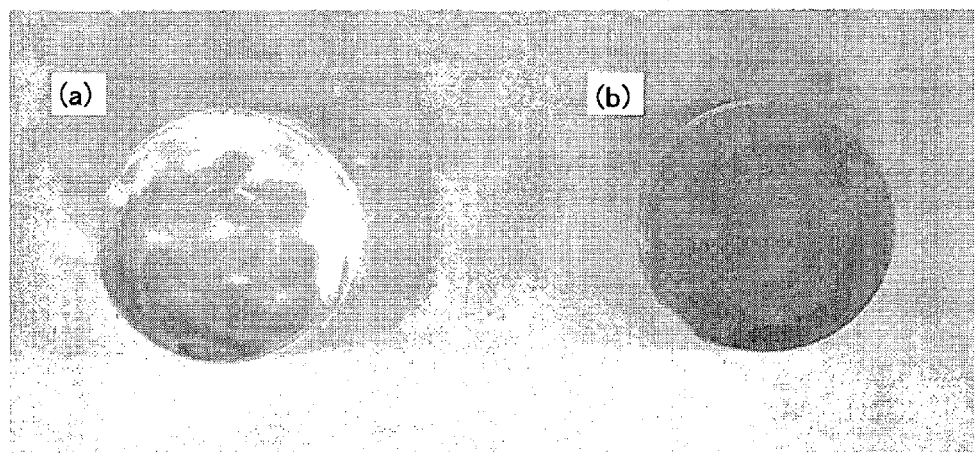
FIG. 1 is a photograph of the ophthalmic lens material after the polymerization according to one embodiment of the present invention, wherein (a) shows the state of the lens material before the irradiation of the light (transparent and colorless), while (b) shows the state of the lens material after the irradiation of the light (colored in pink).

The ophthalmic lens according to the present invention is obtained by using an alkyl (meth)acrylate, as an essential component (polymerizable component), and polymerizing a polymerizable composition of monomers, which at least contains the alkyl (meth)acrylate, under the existence of the rhodamine derivative. In the present specification, the term "(meth)acrylate" is generic to the following two compounds: ". . . acrylate" and ". . . methacrylate". Likewise, terms for the other derivatives of (meth)acrylate are generic to ". . . acrylate" and ". . . methacrylate". In addition to this, it is needless to mention that the term "Me" refers to "methyl group", as it is well known, while the term "Et" refers to "ethyl group".

rhodamine derivative is capable of coloring or changing the color of the polymerizable composition of monomers, depending on the nature of the rhodamine derivative.

As the rhodamine derivative, it is preferable to use a derivative, which is represented by the above-mentioned formula (I).

In the formula (I), each of X and Y is independently selected from the group consisting of $NH_2$, NHMe, NHEt, $NMe_2$ and $NEt_2$. $R^1$ represents H, Me, or Et, while $R^2$ represents H or Me. Z is selected from the group consisting of H, $CH_2$=$C(CH_3)COO$—, $CH_2$=$C(CH_3)COO(CH_2)n$—, and $CH_2$=$C(CH_3)COO(CH_2)n$—O—, and n represents an integer of 1–6.

In particular, as examples of the rhodamine derivative, which are indicated by the above-mentioned general formula (I), the ones which are shown in the following TABLE 1 and TABLE 2 may be used.

TABLE 1

| Name of compound | Colorant | Substituent | | | | |
|---|---|---|---|---|---|---|
| | | X | Y | Z | $R^1$ | $R^2$ |
| 2-(6-amino-3-imino-3H-xanthene-9-yl)benzoic acid hydrochloride | Rhodamine 110 | $NH_2$ | $NH_2$ | H | H | H |
| methyl-2-(6-amino-3-imino-3H-xanthene-9-yl)benzoate hydrochloride | Rhodamine 123 | $NH_2$ | $NH_2$ | H | Me | H |
| ethyl-2-(6-ethylamino-3-ethylimino-3H-xanthene-9-yl)benzoate hydrochloride | Rhodamine 6G | NHEt | NHEt | H | Et | H |
| ethyl-2-(6-ethylamino-3-ethylimino-2,7-dimethyl-3H-xanthene-9-yl)benzoate hydrochloride | Rhodamine 6G extra | NHEt | NHEt | H | Et | Me |
| 2-(6-methylamino-3-methylimino-3H-xanthene-9-yl)benzoic acid perchlorate | Rhodamine 116 | NHMe | NHMe | H | H | H |
| 2-(6-diethylamino-3-diethylimino-3H-xanthene-9-yl)benzoic acid hydrochloride | Rhodamine B | $NEt_2$ | $NEt_2$ | H | H | H |
| ethyl-2-(6-diethylamino-3-diethylimino-3H-xanthene-9-yl)benzoate hydrochloride | Rhodamine 3B | $NEt_2$ | $NEt_2$ | H | Et | H |
| 2-(6-ethylamino-3-ethylimino-2,7-dimethyl-3H-xanthene-9-yl)benzoic acid perchlorate | Rhodamine 19 | NHEt | NHEt | H | H | Me |
| 2-(6-dimethylamino-3-dimethylimino-3H-xanthene-9-yl)benzoic acid hydrochloride | — | $NMe_2$ | $NMe_2$ | H | H | H |
| 2-(6-dimethylamino-3-diethylimino-3H-xanthene-9-yl)benzoic acid hydrochloride | — | $NEt_2$ | $NMe_2$ | H | H | H |

TABLE 2

| Name of compound | Colorant | Substituent | | | | |
|---|---|---|---|---|---|---|
| | | X | Y | Z | $R^1$ | $R^2$ |
| 5-methacryloyloxy-2-(6-diethylamino-3-diethylimino-3H-xanthene-9-yl)benzoic acid hydrochloride | — | $NEt_2$ | $NEt_2$ | $CH_2$=$C(CH_3)COO$— | H | H |
| 5-methacryloyloxypropyl-2-(6-diethylamino-3-diethylimino-3H-xanthene-9-yl)benzoic acid hydrochloride | — | $NEt_2$ | $NEt_2$ | $CH_2$=$C(CH_3)COO(CH_2)_3$— | H | H |
| 5-methacryloyloxypropyl-2-(6-dimethylamino-3-diethylimino-3H-xanthene-9-yl)benzoic acid hydrochloride | — | $NEt_2$ | $NMe_2$ | $CH_2$=$C(CH_3)COO(CH_2)_3$— | H | H |
| methyl-5-methacryloyloxy-2-(6-amino-3-imino-3H-xanthene-9-yl)benzoate hydrochloride | — | $NH_2$ | $NH_2$ | $CH_2$=$C(CH_3)COO$— | Me | H |
| ethyl-5-methacryloyloxy propoxy-2-(6-ethylamino-3-ethylimino-3H-xanthene-9-yl)benzoate hydrochloride | — | NHEt | NHEt | $CH_2$=$C(CH_3)COO(CH_2)_3$—O— | Et | H |

In particular, the rhodamine derivative, which is added and dissolved in the polymerizable composition of monomers, before the polymerizable composition of monomers is polyerized, is a rhodamine dye, which is conventionally used as a colorant etc., or a compound derived from the rhodamine dye. If the rhodamine derivative is added and dissolved in the polymerizable composition of monomers, which at least contains the alkyl (meth)acrylate, the In the present invention, any one of, or any combination of, the derivatives of the rhodamine dye may be suitably selected, and dissolved and contained in the polymerizable composition of monomers.

It is desirable that the concentration of the rhodamine derivative is 0.0005 to 0.1 parts by weight, preferably 0.001 to 0.01 parts by weight, per 100 parts by weight of the total amount of the polymerizable component. This is because, if the amount of the rhodamine derivative is more than 0.1 parts by weight, it is hard to dissolve the rhodamine derivative in the polymerizable composition of monomers, and the resultant ophthalmic lens may be extremely deeply colored by the irradiation of the light, so that the light transmission of the ophthalmic lens may be deteriorated. On the other hand, if the amount of the rhodamine derivative is less than 0.0005 parts by weight, the resultant ophthalmic lens cannot be sufficiently colored by the irradiation of the light, so that the color tends to be indistinct.

On the other hand, the polymerizable composition of monomers, in which the above-mentioned rhodamine derivative is added and dissolved, needs to at least contain an alkyl (meth)acrylate as a polymerizable component (polymerizable monomer). If the alkyl (meth)acrylate is present in the polymerizable composition of monomers, the color of the rhodamine derivative is discolored during the process of the polymerization, so that the rhodamine derivative is contained in or bonded to the ophthalmic lens at its discolored state, although the mechanism of the discoloration has not been revealed.

As examples of the alkyl (meth)acrylate, which is the essential polymerizable component, there may be used alkyl esters of (meth)acrylic acids, such as methyl (meth)acrylate, ethyl (meth)acrylate, propyl (meth)acrylate, butyl (meth)acrylate, pentyl (meth)acrylate, hexyl (meth)acrylate, heptyl (meth)acrylate, for example. Among these examples, an alkyl (meth)acrylate, whose alkyl group of the alkyl ester contains 1 to 4 carbon atoms, is preferable, because the rhodamine derivative demonstrates an excellent solubility as well as an excellent property of the discoloration or the fading of the color in the alkyl (meth)acrylate. Among the alkyl (meth)acrylate, methyl (meth)acrylate, ethyl (meth)acrylate, propyl (meth)acrylate, and butyl (meth)acrylate are especially preferable.

It is generally desirable that the concentration of the alkyl (meth)acrylate is not less than 10% by weight, and preferably not less than 20% by weight, in the polymerizable composition of monomers which comprises polymerizable component. If the concentration is less than 10% by weight, the solubility of the rhodamine derivative tends to be deteriorated, and the property of the discoloration of the color of the rhodamine derivative may also be deteriorated. The upper limit of the amount of the alkyl (meth)acrylate is not particularly limited. However, the upper limit of the amount of the alkyl (meth)acrylate is generally 99.9% by weight, preferably 99% by weight of the total amount of the polymerizable composition of monomers.

Further, to the polymerizable composition of monomers, which has the above-mentioned alkyl (meth)acrylate as an essential component thereof, a cross-linking agent (cross-linkable monomer) is generally added as another polymerizable component. The cross-linking agent is not particularly limited, as long as it is well known and widely used as a cross-linking agent for an ophthalmic lens. Examples of the cross-linking agent include: ethyleneglycol di(meth)acrylate, butanediol di(meth)acrylate, diethyleneglycol di(meth)acrylate, triethyleneglycol di(meth)acrylate, propyleneglycol di(meth)acrylate, dipropyleneglycol di(meth)acrylate, divinylbenzene, allyl (meth)acrylate, vinyl (meth)acrylate, trimethylolpropane tri(meth)acrylate, methacryloyloxyethyl (meth)acrylate, diallyl fumarate, diallyl phthalate, diallyl adipate, divinyl adipate, α-methylene-N-vinyl pyrrolidone, 4-vinylbenzyl (meth)acrylate, 3-vinylbenzyl (meth)acrylate, 2,2-bis((meth)acryloyloxyphenyl)hexafluoropropane, 2,2-bis((meth)acryloyloxyphenyl)propane, 1,2-bis(2-((meth)acryloyloxyhexafluoroisopropyl)benzene, 1,3-bis(2-((meth)acryloyloxyhexafluoroisopropyl)benzene, 1,4-bis(2-((meth)acryloyloxyhexafluoroisopropyl)benzene, 1,2-bis(2-((meth)acryloyloxyisopropyl)benzene, 1,3-bis(2-((meth)acryloyloxyisopropyl)benzene, 1,4-bis(2-((meth)acryloyloxyisopropyl)benzene, N,N'-bis-acryloylcystamine, methylene bis-acrylamide. Any one of, or any combination of, the above-mentioned cross-linking agents may be suitably selected and added to the polymerizable composition of monomers.

Among the above-mentioned cross-linking agents, ethyleneglycol di(meth)acrylate, butanediol di(meth)acrylate, and/or 4-vinylbenzyl (meth)acrylate can be especially preferably employed, because these cross-linking agents can provide excellent mechanical strength to the obtained ophthalmic lens, and effectively exhibit their functions, such as improvement of the ability of copolymerization of the component.

It is preferable that the concentration of the cross-linking agent is 0 to 15% by weight, and is more preferable that the concentration of the cross-linking agent is 0.1 to 10% by weight of the polymerizable composition of monomers (total amount of the polymerizable components). This is because, if the cross-linking agent is excessively added, thus obtained polymer and the resultant ophthalmic lens tend to be fragile.

Moreover, other polymerizable monomer may be added as (an) optional component(s) to the above-mentioned polymerizable composition of monomers, if required. The concentration of the above-mentioned cross-linking agent is preferably 0 to 90% by weight, more preferably 0 to 80% by weight of the polymerizable composition of monomers (total of the polymerizable components), while the concentration of the alkyl (meth)acrylate is not less than 10% by weight, as mentioned above. If the optional component is excessively added, there is an anxiety that the solubility of the rhodamine derivative in the polymerizable composition of monomers may be deteriorated.

The optional component is not particularly limited, as long as it is a polymerizable monomer, which can be copolymerized with the alkyl (meth)acrylate, which is an essential component. The optional component may be selected among conventional components, which are employed to provide an ophthalmic lens. For example, if the ophthalmic lens to be manufactured is a contact lens, a silicon-containing (meth)acrylate, a derivative of a silicon-containing styrene, a derivative of a fluorine-containing styrene, a fluorine-containing alkyl (meth)acrylate, or a silicon-containing macromonomer may be suitably selected, in order to give an oxygen transmission and/or contamination resistance to the obtained polymer. In order to improve the mechanical strength and hardness of the ophthalmic lens, a styrene, a derivative of a styrene, alkyl (meth)acrylate other than the above-mentioned alkyl (meth)acrylate, (meth)acrylic acid, etc., may be suitably selected.

Among the above-mentioned polymerizable monomers, as the silicon-containing (meth)acrylate, pentamethyldisiloxanylmethyl (meth)acrylate, pentamethyldisiloxanylpropyl (meth)acrylate, methyl-bis(trimethylsiloxy)silylpropyl (meth)acrylate, tris(trimethylsiloxy)silylpropyl (meth)acrylate, mono[methyl-bis(trimethylsiloxy)siloxy]bis(trimethylsiloxy)silylpropyl (meth)acrylate, tris[methyl-bis(trimethylsiloxy)siloxy]silylpropyl (meth)acrylate, methyl-bis(trimethylsiloxy)silylpropylglycerol (meth)acrylate, tris(trimethylsiloxy)silylpropylglycerol (meth)acrylate, mono[methyl-bis(trimethylsiloxy)siloxy]bis(trimethylsiloxy) silylpropylglycerol (meth)acrylate, trimethylsilylethyltetramethyldisiloxanylpropylglycerol (meth)acrylate, trimethylsilylmethyl (meth)acrylate, trimethylsilylpropyl (meth)acrylate, trimethylsilylpropylglycerol (meth)acrylate, pentamethyldisiloxanyl propylglycerol (meth)acrylate, methyl-bis(trimethylsiloxy)silylethyltetramethyldisiloxanylmethyl (meth)acrylate, tetramethyltriisopropylcyclotetrasiloxanylpropyl (meth)acrylate, and tetramethyltriisopropylcyclotetrasiloxybis(trimethylsiloxy) silylpropyl (meth)acrylate, for instance, may be used.

As the examples of the silicon-containing derivative of a styrene, trimethylsilylstyrene, and tris(trimethylsiloxy)silylstyrene, for instance, may be used. On the other hand, as the examples of the fluorine-containing derivative of a styrene, o-fluorostyrene, m-fluorostyrene, p-fluorostyrene, trifluorostyrene, perfluorostyrene, p-trifluoromethylstyrene, o-trifluoromethylstyrene, and m-trifluoromethylstyrene, for instance, may be used.

Moreover, as the examples of the fluorine-containing alkyl (meth)acrylate, 2,2,2-trifluoroethyl (meth)acrylate, 2,2,3,3-tetrafluoropropyl (meth)acrylate, 2,2,3,3,3-pentafluoropropyl (meth)acrylate, 2,2,2-trifluoro-1-trifluoromethylethyl (meth) acrylate, 2,2,3,3-tetrafluoro-tert-pentyl (meth)acrylate, 2,2,3,4,4,4-hexafluorobutyl (meth)acrylate, 2,2,3,3,4,4-hexafluorobutyl (meth)acrylate, 2,2,3,4,4,4-hexafluoro-tert-hexyl (meth)acrylate, 2,2,3,3,4,4,4-heptafluorobutyl (meth)acrylate, 2,2,3,3,4,4,5,5-octafluoropentyl (meth)acrylate, 3,3,4,4,5,5,6,6-octafluorohexyl (meth) acrylate, 2,3,4,5,5,5-hexafluoro-2,4-bis(trifluoromethyl) pentyl (meth)acrylate, 2,2,3,3,4,4,5,5-nonafluoropentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8,8-tridecafluorooctyl (meth)acrylate, 2,2,3,3,4,4,5,5,6,6,7,7,7-tridecafluoroheptyl (meth)acrylate, 3,3,4,4,5,5,6,6,7,7,8,8,9,9,10,10-hexadecafluorodecyl (meth)acrylate, 3,3,4,4,5,5,6,6, 7,7,8,8,9,9,10,10, 10-heptadecafluorodecyl (meth)acrylate, 3,3,4,4,5,5,6,6,7,7, 8,8,9,9,10,10,11,11-octadecafluoroundecyl (meth)acrylate, 3,3,4,4,5,5,6,6,7,7,8,8,9,9,10,10,11,11,11-nonadecafluoroundecyl (meth)acrylate, 3,3,4,4,5,5,6,6,7,7,8,8,9,9,10,10, 11,11,12,12-eicosafluorododecyl (meth)acrylate, 2-hydroxy-4,4,5,5,6,7,7,7-octafluoro-6-trifluoromethylheptyl (meth)acrylate, 2-hydroxy-4,4,5,5,6,6,7,7,8,9,9,9-dodecafluoro-8-trifluoromethylnonyl (meth)acrylate, and 2-hydroxy-4,4,5,5,6,6,7,7,8,8,9,9,10,11,11,11-hexadecafluoro-10-trifluoromethylundecyl (meth)acrylate may be used.

In addition to the above, the silicon-containing macromonomer is a conventionally well-known macromonomer, containing molecules, to which silicon (Si) is bonded. Typical examples of the silicon-containing macromonomer are polysiloxane macromonomer, which has polymeric groups at its both ends, and which is described in JP-A-2-188717, JP-2-213820, and JP-A-3-43711, and polysiloxane macromonomer, whose polymeric group is bonded to the principal chain of siloxane by an urethane bond.

As examples of the styrene and its derivative, styrene, o-methylstyrene, m-methylstyrene, p-methylstyrene, p-ethylstyrene, o-hydroxystyrene, m-hydroxystyrene, p-hydroxystyrene, trimethylstyrene, tert-butylstyrene, perbromostyrene, dimethylaminostyrene, α-methylstyrene etc., may be used.

The "alkyl (meth)acrylate other than the above-mentioned alkyl (meth)acrylate" means that the alkyl (meth)acrylate is different from the alkyl (meth)acrylate which is employed as the essential polymerizable component, as stated above. The carbon number of the alkyl (meth)acrylate other than the above-mentioned alkyl (meth)acrylate is not limited, and a linear, branched, or a cyclic alkyl (meth)acrylate, such as isobutyl (meth)acrylate, n-pentyl (meth)acrylate, tert-pentyl (meth)acrylate, hexyl (meth)acrylate, 2-methylbutyl (meth) acrylate, heptyl (meth)acrylate, octyl (meth)acrylate, 2-ethylhexyl (meth)acrylate, nonyl (meth)acrylate, decyl (meth) acrylate, dodecyl (meth)acrylate, stearyl (meth)acrylate, cyclopentyl (meth)acrylate, cyclohexyl (meth)acrylate, etc., may be used.

In addition to the above-mentioned polymerizable monomer, other polymerizable monomer such as 2-hydroxyethyl (meth)acrylate, dimethylacrylamide, diethylacrylamide, isopropylacrylamide, etc., may be optionally added to the polymerizable composition of monomers.

Any one of, or any combination of, the above-mentioned optional components may be suitably selected, based on properties required by the intended ophthalmic lens. The concentration of the total amount of these optional components is not more than 90% by weight, preferably 80% by weight of the polymerizable composition of monomers, as stated above.

Each of the above-mentioned polymerizable components (the alkyl (meth)acrylate, the cross-linking agent, and the optional component(s)) is suitably mixed, in accordance with the type (for example, if the ophthalmic lens is a contact lens, hard contact lens and soft contact lens, non-water-contained or non-water-absorptive and water-contained or water-absorptive, etc.) of the intended ophthalmic lens, so that the each of the components has the expected concentration in the obtained polymerizable composition of monomers. Subsequently, the rhodamine derivative is added to the polymerizable composition of monomers, so that the polymerizable composition of monomers contains the rhodamine derivative. If the rhodamine derivative is added in this way, the added rhodamine derivative is dissolved in the polymerizable composition of monomers, and the polymerizable composition of monomers is colored in accordance with the nature of the added rhodamine derivative.

By suitably adding a polymerization initiator to the polymerizable composition of monomers, which is obtained as described above, intended ophthalmic lens in accordance with the present invention is obtained. It is further possible to add conventionally used various additives such as a UV-absorbing agent to provide the ophthalmic lens with an UV-absorbability, or a colorant other than the above-mentioned rhodamine derivative, as one of the components of the ophthalmic lens. If the colorant other than the rhodamine derivative is added to the components of the ophthalmic lens, the tone of color of the area, which is colored by the irradiation of the light after the polymerization of the resultant lens (marked area), is different from that of the rest of the area of the resultant lens, so that the colored area (marked area) is still more emphasized. It is needless to say that the colorant other than the rhodamine derivative should not obstruct the object of the present invention, and it should be used within an amount which does not obstruct the object of the present invention.

As the method of the polymerization, there may be used, for example, a heat-polymerization, wherein the polymerizable composition of monomers is heated gradually or in steps from the room temperature to about 120° C., after the polymerization initiator is added to the polymerizable composition of monomers. Alternatively, there may be used a photopolymerization, wherein the polymerizable composition of monomers is polymerized by exposure to an electromagnetic radiation such as microwave, an ultraviolet radiation, a radiant ray (γ-ray), etc. Either of these methods of the polymerization can be employed, however, the heat-polymerization is more preferable, because the heat-polymerization contributes to an excellent discoloration or fading after the polymerization. There are further methods of the polymerization such as a mass polymerization and a solvent polymerization using a solvent, etc. One of these methods or another method for polymerization may be employed without causing any problem.

The forming method (processing method) of the ophthalmic lens is not particularly limited, either. There may be employed a cutting method, wherein the polymerizable composition of monomers is put into a suitable mold or container for polymerization and polymerized in the mold or container, and the resultant lens blank (polymer), which is bar-shaped, block-shaped, plate-shaped, etc., is further formed into a desired configuration by a known mechanical processing such as cutting or grinding, etc. Instead of the cutting method, there may also be employed a molding method, wherein a predetermined polymerizable component is put into a mold cavity, and the desired shape is obtained by polymerization of the polymerizable component in the mold cavity. Any other forming method, which is conventionally well known to a person in the art, such as a combination of the molding and the cutting methods, wherein the finishing work is done by effecting thereon machining operations, may also be employed, if required.

The photopolymerization initiator may be suitably selected, based on the method of polymerization to be employed. Generally, if the heat-polymerization is employed, a radical polymerization initiator is used, and if the polymerization is achieved by the exposure to the electromagnetic radiation, a photopolymerization initiator or a photosensitizer is used.

In particular, as the radical polymerization initiator, various kinds of conventionally well-known radical polymerization initiator can be suitably selected and employed. For example, azobisisobutyronitrile, azobis-2,4-dimethylvaleronitrile, benzoyl peroxide, tert-butyl hydroperoxide, cumene hydroperoxide, etc., may be used.

On the other hand, as the photopolymerization initiator, various kinds of conventionally well-known photopolymerization initiator can be employed. For example, there may be used benzoin based photopolymerization initiator such as methylorthobenzoylbenzoate, methylbenzoylformate, benzoinmethylether, benzoinethylether, benzoinisopropylether, benzoinisobutylether, benzoin-n-butylether, etc.; phenone photopolymerization initiator such as 2-hydroxy-2-methyl-1-phenylpropane-1-one, p-isopropyl-α-hydroxyisobutylphenone, p-tert-butyltrichloroacetophenone, 2,2-dimethoxy-2-phenylacetophenone, α,α-dichloro-4-phenoxyacetophenone, N,N-tetraethyl-4,4-diaminobenzophenone, etc.; 1-hydroxycyclohexylphenylketone; 1-phenyl-1,2-propanedione-2-(o-ethoxycarbonyl)oxime; thioxanthone photopolymerization initiator such as 2-chlorothioxanthone, 2-methylthioxanthone etc.; dibenzosuberone; 2-ethylanthraquinone; benzophenoneacrylate; benzophenone; and benzyl, etc.

Any one of, or any combination of, above-mentioned polymerization initiators may be used. In either case, it is desirable that the total amount of the polymerization initiators is not less than 0.005 parts by weight, preferably not less than 0.01 parts by weight per 100 parts by weight of the polymerizable composition of monomers (total amount of the polymerizable component) in order to promote the polymerization at a sufficient speed. For avoiding a problem, such as a generation of bubbles in the ophthalmic lens to be obtained, the upper limit of the polymerization initiator is generally 2 parts by weight, preferably 1 part by weight, per 100 parts by weight of the total amount of the polymerizable component.

As a result, the intended ophthalmic lens such as a contact lens or an intraocular lens is obtained by the polymerization of the polymerizable components. According to the present invention, the color of the rhodamine derivative is gradually discolored or faded as the polymerization progresses, so that the rhodamine derivative in the resultant polymer is in a state of completely discolored or almost discolored. The ophthalmic lens made of the polymer obtained in this way has a high degree of transparency as well as sufficient physical properties, which are necessary for the ophthalmic lens. In addition to the above, the ophthalmic lens obtained in this way has a characteristic that it is capable of developing (recovering) the color of the rhodamine derivative at the position where the light is irradiated. Once the ophthalmic lens is colored, the color is not discolored or faded by an application of heat to the lens, for instance.

Therefore, if the predetermined position of the obtained ophthalmic lens is irradiated with the light, in a way that the irradiated right forms the desired shape on the ophthalmic lens, a clear and easily readable mark can be formed. In particular, according to the present invention, body of the ophthalmic lens is colored, so that not only on the surface of the ophthalmic lens, but also throughout the depth of the ophthalmic lens is colored. Therefore, the mark, which can be remarkably easily recognized from any side of the ophthalmic lens, can be formed.

In order to mark the ophthalmic lens obtained as described above, there is a method of using a mask including a section which permeates the irradiated light and which has a shape corresponding to the shape of the desired mark. In this method, the ophthalmic lens is irradiated with the light after the lens is covered with the mask. Alternatively, there is a method of using a laser radiation to form the desired mark. If the former method of using a mask is employed, the material for the mask is not particularly limited, as long as the material is capable of insulating the light. For example, a paper or an aluminum foil may be used as the material.

The light to be irradiated in order to restore the color of the rhodamine derivative, as described above, is not particularly limited, either. There is no problem in using a natural light such as a sunlight, etc., or using an artificial light such as an incandescent lamp, a fluorescent light, or a laser radiation, etc.. However, it is preferable that the light has a wavelength within a range of 320–420 nm, and is more preferable that the light has a wavelength within a range of 350–380 nm. Irradiation of the light, which has the above-mentioned wavelength, enables the coloration of the rhodamine dye more effectively. If a light, whose wavelength is less than 320 nm, is irradiated, the quality of the lens material may be deteriorated. On the other hand, if the wavelength of the light is more than 420 nm, the irradiation time would be longer, or the color of the rhodamine derivative would not be completely recovered, so that there is an anxiety of deterioration of the coloration of the rhodamine derivative. Therefore, it is desirable to irradiate the light, which has the above-mentioned wavelength, whenever it is possible.

It is also preferable that the energy amount of the light for the irradiation is 0.1–50 mW/cm$^2$, and is more preferable that the energy amount is 1–30 mW/cm$^2$. If the irradiation energy is too large, there is an anxiety of deteriorating the quality of the lens material. On the other hand, if the irradiation energy is too small, the rhodamine derivative does not develop the color satisfactorily, so that the coloration of the rhodamine derivative is deteriorated.

The period of time of the irradiation of the light for the marking is suitably selected, considering the type of the ophthalmic lens to be marked, wavelength of the light, amount of the energy, etc. However, the period of time is usually selected within a range of one second to 60 minutes. If the period of time of the irradiation is less than one second, there is an anxiety that the rhodamine derivative does not develop the color sufficiently. On the other hand, if the period of time of the irradiation is longer than 60 minutes, the time for the marking is so long that there is an anxiety of deteriorating the productivity and the quality of the lens material.

If the marking of the ophthalmic lens is implemented as described above, the mark is formed by coloring the lens material itself, so that the color does not fade by cleaning of the lens by rubbing, unlike the mark which is adhered by printing, for instance, to the surface of the lens. In addition, the mechanical strength of the ophthalmic lens will not be deteriorated by the marking in accordance with the present method, because no recess is engraved on the lens surface.

The ophthalmic lens according to the present invention, especially the contact lens, may be colored not only by an intentional irradiation of the light, but also by a normal use. In other words, if the lens is worn on an eye, the lens naturally receives a light such as a sunlight or a light from an illumination, so that all over the contact lens is gradually colored and the color becomes stronger in accordance with the time past. Therefore, if a color, which indicates the end of the period of use (expiration date), is predetermined, this process of coloring has a function as an indicator to confirm the length of the use of the contact lens. For example, the expiration date of the contact lens, which is marked as described above, may be predetermined as the time when overall the contact lens is colored in the same color as the mark and the mark cannot be recognized. In this case, the user of the contact lens can realize the expiration date of the contact lens, so that the user can avoid an adverse effect to the eye caused by the use of an expired contact lens.

EXAMPLES

To further clarify the concept of the present invention, some examples of the invention will be described. It is to be understood that the invention is not limited to the details of the illustrated examples and the foregoing description, but may be embodied with various changes, modifications and improvements, which may occur to those skilled in the art without departing from the scope of the invention defined in the attached claims.

Production of an Ophthalmic Lens Material

Rhodamine B in the above TABLE 1 was obtained as the rhodamine derivative, while a methyl methacrylate and an ethyl methacrylate were obtained as the alkyl (meth)acrylate. There was also prepared an ethyleneglycol dimethacrylate, while tris(trim ethylsiloxy)silylpropyl methacrylate, tris(trimethylsiloxy)silylstyrene, and trifluoroethyl methacrylate were also prepared as the other polymerizable components (above-mentioned optional components). In addition, 2,2-azobis(2,4-dimethylvaleronitrile) was prepared as the polymerization initiator.

Fluids of Examples 1 to 5 were prepared by mixing the rhodamine derivative, alkyl (meth)acrylate, the cross-linking agent, the other polymerizable components, and the polymerization initiator, in a conical flask, after each of the components was weighed on the scale, so that the each of the components in the mixture has the respective concentration as described in the TABLE 3 below. Each of the resultant fluids of Examples 1 to 5 was poured into respective test tubes. Each of the polymerizable compositions of monomers was transparent and colorless at first, but each of them was colored in pink after the rhodamine derivative was added to and dissolved in the composition.

Subsequently, the test tubes of the Examples 1 to 5, which contain the respective polymerizable components were heated in a constant temperature bath under a nitrogen atmosphere at 35° C. for 40 hours, and then the temperature was increased to 50° C. and kept at 50° C. for eight hours. In this way, the polymerizable components were preliminarily polymerized. Thus obtained preliminary polymers were moved into a drying machine, and completely polymerized by gradually heating from 50° C. to 120° C. As a result, a stick-shaped polymer (an ophthalmic lens blank) was obtained.

Thus obtained ophthalmic lens blanks of the Examples 1 to 5 were evaluated according to the following Evaluation standards regarding the discoloration or fading of the color after the polymerization. The results of the evaluation were indicated in the TABLE 3 below.

<Evaluation Standards>
completely discolored: ○
original color is slightly retained: Δ
no discoloration is occurred: X The obtained stick-shaped ophthalmic lens blanks of Examples 1 to 5 were processed into a button-shaped lens blank, on a lathe [see FIG. 1(a)]. Then the button-shaped ophthalmic lens blanks were irradiated with an ultraviolet light having a wavelength of 360 nm (5 mW/cm$^2$), for 30 minutes. Recovered color of the discolored rhodamine derivative of the each of the button-shaped ophthalmic lens blanks was re-evaluated according to the following Evaluation standards. The results of the re-evaluation were shown in the TABLE 3 below [see FIG. 1 (b)].

<Evaluation Standards of Coloration After the Irradiation of the Light>
color of the components just after the mixing was completely recovered: ○
recovered color was lighter than that of the components just after the mixing: Δ
no color was recovered: X

TABLE 3

| | | | Examples | | | | |
|---|---|---|---|---|---|---|---|
| | | | 1 | 2 | 3 | 4 | 5 |
| Concentration [part by weight] | Polymerizable component | MMA | 50 | 20 | 50 | 50 | — |
| | | EMA | — | — | — | — | 97 |
| | | SiMA | 45 | 75 | 25 | — | — |
| | | SiSt | — | — | — | 45 | — |
| | | 3FEMA | — | — | 20 | — | — |
| | | EDMA | 5 | 5 | 5 | 5 | 3 |
| | Rhodamine B | | 0.005 | 0.001 | 0.003 | 0.002 | 0.01 |
| | V-65 | | 0.1 | 0.1 | 0.2 | 0.2 | 0.1 |
| Discoloration after polymerization | | | ○ | Δ | ○ | ○ | ○ |
| Development of color after irradiation with light | | | ○ | ○ | ○ | ○ | ○ |

Wherein,
MMA: methyl methacrylate
EMA: ethyl methacrylate
SiMA: tris(trimethylsiloxy) silylpropyl methacrylate
SiSt: tris(trimethylsiloxy) silylstyrene
3FEMA: trifluoroethyl methacrylate
EDMA: ethyleneglycol dimethacrylate
V-65: 2,2-azobis(2,4-dimethylavaleronitrile)

As shown in the above TABLE 3, each of the ophthalmic lens blanks of Examples 1 to 5 contained the rhodamine derivative at its discolored state, and develop colors after each of the ophthalmic lens blank was irradiated with the light.

Marking Process

A plate-shaped polymer was obtained by polymerizing a mixture, whose composition was similar to the above Example 1, between two glass plates at 80° C. for one hour.

Figure 2:
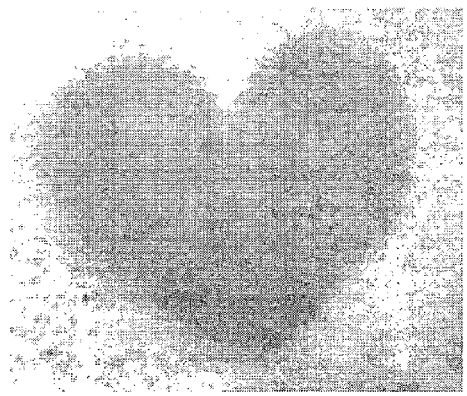
FIG. 2 is a photograph of the lens material according to one embodiment of the present invention, wherein a heart-shaped mark is marked on the lens material by using a mask.

As the mask, an aluminum foil, of which a heart-shaped hole was cut out, was prepared. Then the above-mentioned plate-shaped polymer was covered with the mask, and a UV-light, whose wavelength was 360 nm (5 mW/cm$^2$), was irradiated from a higher place toward the plate-shaped polymer covered with the mask for 30 minutes. Accordingly, it was confirmed that a color was recovered only at a position, which was irradiated with the UV-light, i.e., at the position which was not covered with the mask, and the recovered color was pink [see FIG. 2].

Besides, a laser radiation having a dominant wavelength of 360 nm was irradiated to the above-mentioned plate-shaped polymer, while the plate-shaped polymer was moved relatively. In this way, it was also confirmed that the color was recovered only at a position, which was irradiated with the laser radiation, and the color was pink.

INDUSTRIAL APPLICABILITY

As is apparent from the foregoing description, the ophthalmic lens of the present invention consists of a polymer, which is obtained by a polymerization of a polymerizable composition of monomers, which contains an alkyl (meth) acrylate as an essential polymerizable component thereof, under the existence of the rhodamine derivative. For this reason, the ophthalmic lens has a characteristic that the color of the lens is changed (developed) by the subsequent irradiation of the light, at the position where the light is irradiated.

If the above-mentioned ophthalmic lens is marked by the irradiation of the light, the problems such as discoloration of the mark or deterioration of the mechanical strength of the lens caused by cleaning of the lens by rubbing are advantageously avoided, and a clear and easily readable mark can be formed.

What is claimed is:

1. An ophthalmic lens comprising a polymer and a rhodamine derivative in its discolored state, in which the polymer is obtained by a polymerization of a polymerizable composition of monomers, which contains an alkyl (meth) acrylate as an essential component thereof, and the polymerization of the polymerizable composition of monomers is carried out while the rhodamine derivative is contained in the composition, wherein the rhodamine derivative in the polymer is capable of developing a color by an irradiation of a light, and wherein said rhodamine derivative is a compound represented by the following formula (I),

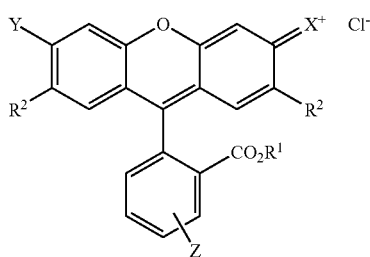

wherein each of X and Y is independently selected from the group consisting of $NH_2$, NHMe, NHEt, $NMe_2$ and $NEt_2$; Z is selected from the group consisting of H, $CH_2$=$C(CH_3)$COO—, $CH_2$=$C(CH_3)$COO$(CH_2)n$—, and $CH_2$=$C(CH_3)$COO$(CH_2)n$—O—; and n represents an integer of 1–6.

2. An ophthalmic lens according to claim 1, wherein an alkyl group of said alkyl (meth)acrylate contains 1–4 carbon atom(s).

3. An ophthalmic lens according to claim 1, wherein a concentration of the alkyl (meth)acrylate is not less than 10% by weight in the polymerizable composition of monomers.

4. A method of marking an ophthalmic lens according to claim 1, wherein a mark is formed by irradiation of a light to a predetermined position of the lens, so as to develop the color of the rhodamine derivative located in the predetermined position.

5. A method of marking an ophthalmic lens according to claim 4, wherein the light has a wavelength of 320–420 nm.

6. A method of marking an ophthalmic lens according to claim 5, wherein the light has a wavelength of 350–380 nm.

* * * * *